W. JARRELL.
COTTON-SEED PLANTER.
No. 172,741. Patented Jan. 25, 1876.
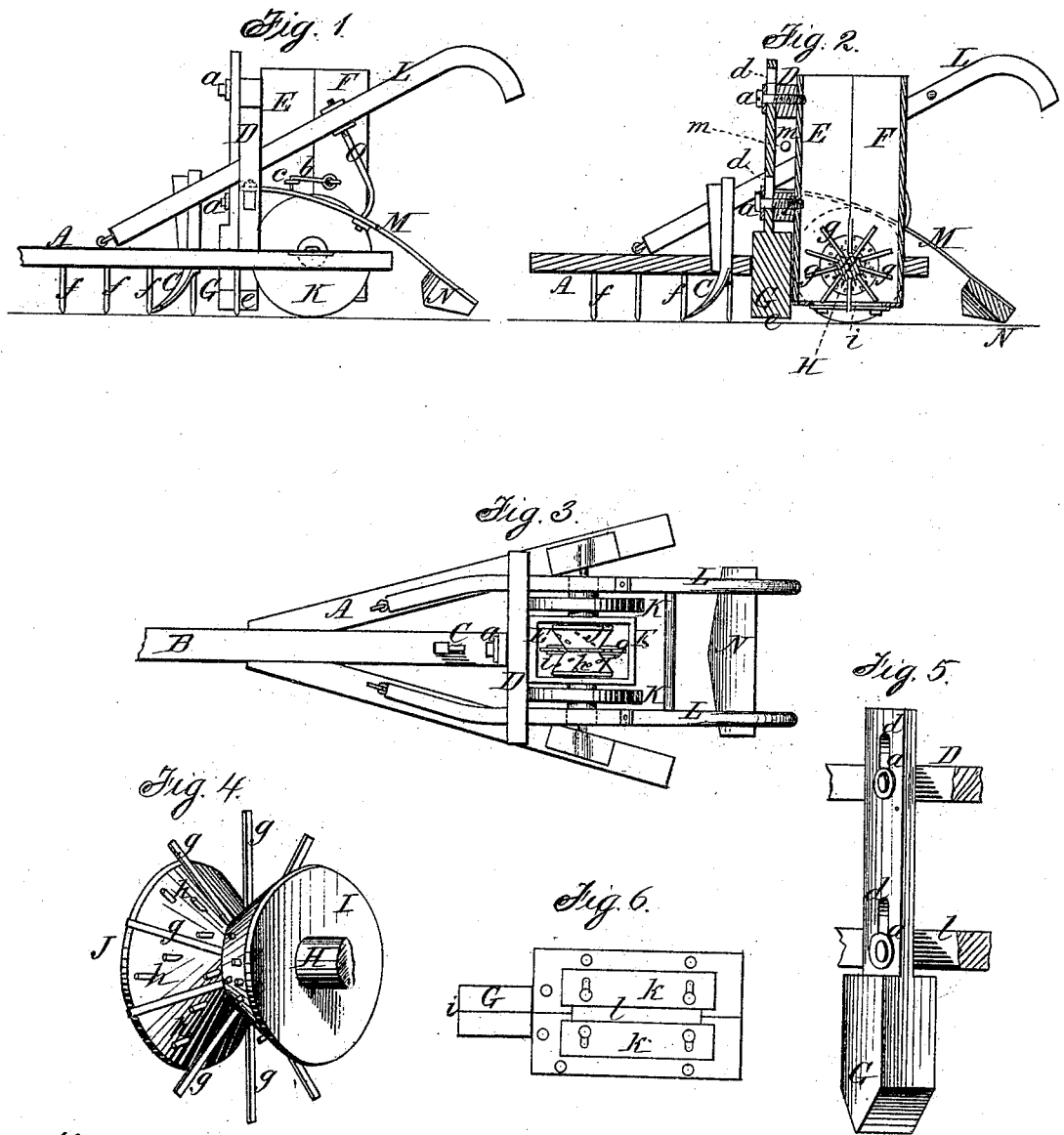

UNITED STATES PATENT OFFICE.

WILLIAM JARRELL, OF HUMBOLDT, TENNESSEE, ASSIGNOR OF ONE-HALF HIS RIGHT TO WATKINS H. DODSON, OF SAME PLACE.

IMPROVEMENT IN COTTON-SEED PLANTERS.

Specification forming part of Letters Patent No. 172,741, dated January 25, 1876; application filed October 15, 1875.

*To all whom it may concern:*

Be it known that I, WILLIAM JARRELL, of Humboldt, in the county of Gibson and State of Tennessee, have invented certain new and useful Improvements in Cotton-Seed Planter; and I do hereby declare that the following is a full, clear, and exact description thereof, which will enable others skilled in the art to which it pertains to make and use the same, reference being had to the accompanying drawing, and to the letters of reference marked thereon, which form a part of this specification.

I have produced an improved planter for cotton-seed with a view to obtain the best results, and to render it simple and effective in operation, not only in delivering the seed with a regular flow, but to properly prepare the ground to receive it and to cover it into the ridge.

The particular features which constitute my improvements will be more specifically set forth in the claims, and which will embrace the combinations and construction of the several devices which, so far as I know, are not found in any planter in use.

In the accompanying drawings, Figure 1 represents a side view of a cotton-seed planter embracing my invention; Fig. 2, a vertical longitudinal section; Fig. 3, a top view; Fig. 4, a view of the double-cone seed-distributer, with its long fingers and short obliquely-arranged rows of pins for drawing the seed to the fingers; Fig. 5, a view of the wooden furrow-former, which acts in conjunction with the furrow-opener; and Fig. 6, the bottom of the hopper.

The harrow A is of the ordinary construction, except that the tongue B runs back nearly to the front of the hopper, for the purpose of holding the furrow-opener C.

A vertical cross-frame, D, rises from the harrow-frame in front of the hopper, and to this frame the front section E of a vertical straight-sided hopper is secured by bolts $a$, the rear section F of said hopper being secured removably to the fixed section by means of hooks $b$ fastening into eyes $c$, Fig. 1.

A wooden furrow-former, G, is fixed vertically in position in front of the hopper and in rear of the furrow-opener C by the same bolts which secure the fixed section thereof to the vertical frame D, and the opener and the furrow-former are set back as close to the hopper as possible to prevent the harrow-teeth from filling up the furrow they make.

The furrow-former is set between the cross-frame D and the inner end of the tongue, and has slots $d$, through which the securing-bolts pass to allow it to be adjusted vertically to suit the required depth of furrow. Its lower end $e$ is simply V-shaped, and runs in the furrow formed by the opener, and presses and smooths out the furrow, breaking the clods, if any, and leaves the furrow with smooth compact sides to receive the seed. The harrow-teeth $f$ serve to smooth the ridge or bed off, breaking and knocking the clods to pieces.

The distributing-roller is arranged in the bottom of the hopper, upon a horizontal shaft, H, suitably journaled in the rear ends of the harrow-frame; and it consists of two cones, or a roller formed of two cones, I J, with their truncated ends joined centrally with the hopper.

From the line of junction of the cones long fingers $g$ radiate, and the surfaces of the cones are provided with short pins $h$, set in oblique rows, running from the center to the ends of the cones, and draws or bears the seed to the center in the manner of an auger as the cones revolve. These short pins supply the long fingers with the seed, and they carry it down through a long opening, $i$, in the bottom of the hopper. The sides of the hopper being vertical, the distributing-cones work closely therein, the roller-shaft passing through the sides of the hopper, which are provided with semicircular openings in each section, which, when fitted together, do not bear upon the shaft.

Two wheels, K K, are secured to the roller-shaft, between the sides of the hopper and the harrow-frame, and give motion to the distributer. When the distributer is fitted in place the rear section of the hopper is set on the front section with dowel-pins, and secured by the hooks or otherwise.

The bottom of the hopper is in two pieces, and forms a long opening, $i$, centrally with the smallest diameter of the cones, for the passage of the seed from the hopper, and through this opening the long fingers discharge the seed, and project about one-half or three-quarters of an inch, so as to draw the seed through and deposit it in the furrow. These bottom pieces are secured to the sections of the hopper, and two slotted gage-plates, k k, are secured on each side of the bottom opening, to allow them to be adjusted nearer to or farther apart to regulate the quantity of seed to be planted.

The front ends of the handles L L are hinged to the harrow-frame near its front, and pass back between the sides of the hopper and the posts of the vertical cross-frame, and are united by a round. They are united by two bow-springs, M, connected by their front ends to a cross-tie, l, of the frame D, and carry at their rear ends a coverer, N, and these springs are connected by brace-rods O to the handles, so that the front of the handles being hinged, and their rear end being connected to the springs, enables the operators to press down or lighten up at pleasure to operate the coverer. This is sometimes important, as one part of the field may be quite rough and another part loose.

Pins m project from the cross-frame posts in positions over the handles, so that in lifting the planter to turn it round the handles strike the pins and relieve the springs of all strain.

The bottom of the hopper, when the planter is working, is only three or four inches from the furrow or top of the ridge, and the seed is therefore distributed in a straight row and without scattering.

The arrangement of the planting device at the rear of the harrow causes it to run steady, as the opener, the furrow-former, and the wheels aid in holding it to the ridge. The straight-sided hopper, with the double-cone roller, leaves no chance for the seed to bridge, as the arch formed by the two cones is down instead of being up, and the fiber of the cotton prevented from sticking together and wedging or hanging in the hopper. The position of the distributer allows the harrow to run as deep as it may, and yet the wheels will turn.

Double cones joined at their apices and bases, and provided with long and short pins, have been used as a distributing device in cotton-seed planters, and a coverer for the seed has been combined with the handles and the hopper in various ways, while furrow-formers have been used in connection with furrow-openers, and these things in any broad sense I do not claim; but rows of pins extending obliquely from the line which joins the two cones to the ends thereof, to draw the seed toward the middle of the cones and to the radial fingers, form a new feature.

The manner of securing the hopper and the furrow-former to the frame by the same bolts, and allowing the furrow-former to be adjusted thereon, is also new, and renders the construction and arrangement very compact, while the hinged handles, in connection with fixed stops and spring-arms, serve to adjust both the machine and the coverer, and relieve the spring-arms of the coverer of all undue strain.

I claim—

1. The coverer I J, provided with the pins h, extending in oblique rows from the line of the fingers g up to the large ends of the cones, and combined for operation with the central fingers and the cones, to draw the seed down the inclined sides to the middle of the cones and the opening in the hopper, as shown and described.

2. The fixed hopper-section E and the post furrow-former G, combined with the cross-frame D, and secured thereto by the same bolts a a upon which said furrow-former is adjusted, all constructed and arranged as shown and described.

3. The handles L, cross-frame D, coverer spring-arms M, their adjusting-rods O, and the fixed stops m in the cross-frame, all combined as and for the purpose herein set forth.

In testimony that I claim the foregoing I have affixed my signature in presence of two witnesses.

WILLIAM JARRELL.

Witnesses:
S. D. WADDILL,
J. E. FULGHUM.